Sept. 20, 1927.
C. J. RATEIKE
1,642,696
PROCESS OF FORMING OBJECTS WITH INTEGRAL CUP AND SHANK
Filed May 9, 1924
2 Sheets-Sheet 1
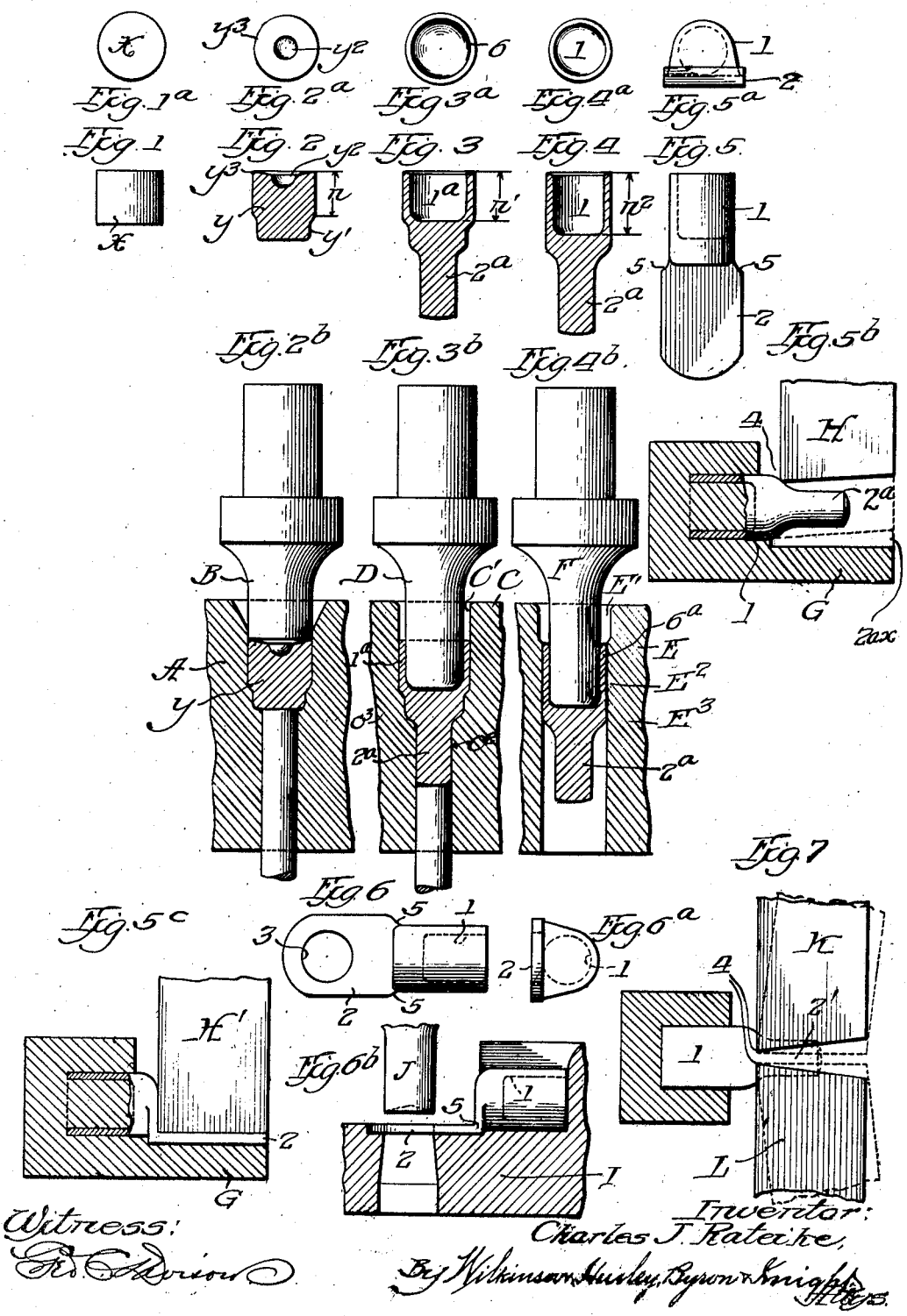

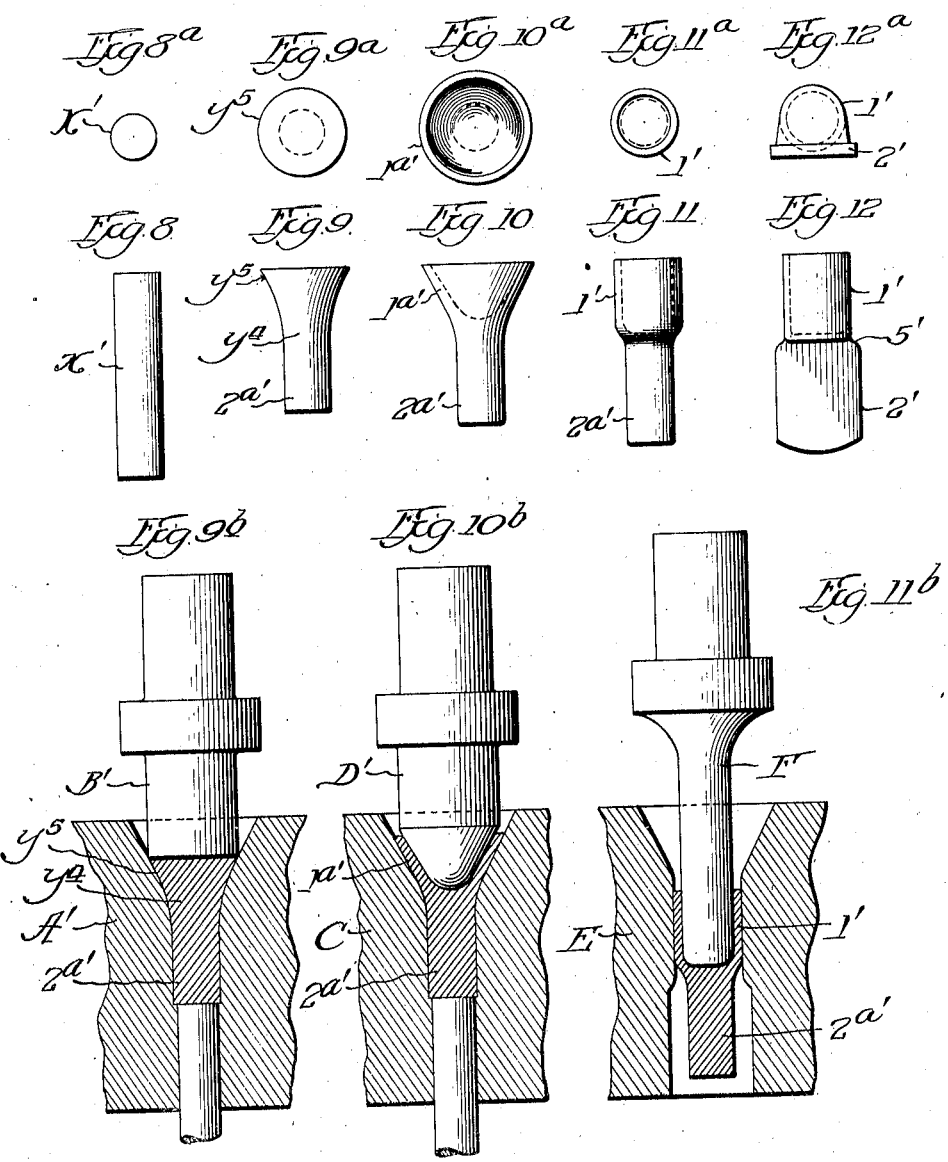

Patented Sept. 20, 1927.

1,642,696

UNITED STATES PATENT OFFICE.

CHARLES J. RATEIKE, OF CHICAGO, ILLINOIS, ASSIGNOR TO CHICAGO FORGING & MFG. CO., OF CHICAGO, ILLINOIS, A CORPORATION OF ILLINOIS.

PROCESS OF FORMING OBJECTS WITH INTEGRAL CUP AND SHANK.

Application filed May 9, 1924. Serial No. 712,057.

This invention relates to a method of producing electric cable attaching terminals or other objects embodying in their construction a cup or socket portion and a shank portion inegral therewith; and the invention has for its object to produce such an object from a solid slug, without waste incident to drilling, trimming, or finishing; to accomplish the result with a minimum expenditure of power; and to provide a series of steps affording superior control over the disposition of the metal in passing it from its original to its ultimate form.

One underlying feature of the invention consists in converting a solid slug of metal into an object having an integral cup and shank, by subjecting the slug to the action of a punch having a transverse dimension substantially less than that of the cup to be formed, while the slug is confined in the cavity of a die which defines the exterior dimension of the cup as well as that of the shank to be formed, forcing the punch into the slug until the interior portion of the metal is extruded into the shank cavity, and permitting the exterior portion of the metal which forms the wall of the cup to flow, during the extruding process, oppositely to the movement of the punch, thereby building up a depth of wall to the cup materially beyond the distance of penetration of the punch into the original slug. Another feature consists in changing the transverse dimension of the die cavity from the cup-forming portion to the shank-forming portion gradually, as by tapering or stepping, so that the metal flowing into the wall of the cup under the displacing action of the punch may take a diagonal direction and favor the upbuilding of the wall. Still another feature consists in forming the cup in stages of progressively increasing depth and decreasing diameter, as by developing an integral shank and cup by the combined extruding and wall flowing operation, and then forcing the piece thus formed through a reducing die which contracts the cup upon a smaller punch and flows the surplus metal still further in the direction of the axis of the cup to increase the depth of the cup. Still another feature consists in forming a flattened shank from a tapered shank of round section by pressing the shank between members which impinge a thicker portion of the shank adjacent the cup in advance of the portion remote therefrom, and thereby developing longitudinal flowing of the metal of the shank away from the cup, with the result of elongating the ultimate shank and developing substantial laterally extending shoulders at the juncture of the shank with the cup; this portion of the process being preferably accomplished in a plurality of steps, of which the ultimate step reduces the flattened shank to uniform thickness throughout.

In order that the invention may be fully understood, the several stages of the process are illustrated in the accompanying drawing, both by the object as it exists at the several stages, and by instrumentalities employed for developing each stage. In said drawing—

Figures 1, 2, 3, 4, 5, and 6 represent in side elevation or longitudinal section, six stages in the development of the object, commencing with the slug or rough piece of solid metal and ending with the finished article.

Figures 1ª, 2ª, 3ª, 4ª, 5ª, and 6ª represent end views of the object in its said several stages.

Figures 2ᵇ, 3ᵇ, 4ᵇ, 5ᵇ, 5ᶜ, and 6ᵇ are sectional views illustrating instrumentalities employed in developing the several stages illustrated by figures bearing the numbers 2 to 6 and 2ª to 6ª, inclusive.

Figure 7 is a view suggesting the application of steps corresponding substantially to Figures 5ᵇ and 5ᶜ, whereby the shank is flattened in central longitudinal relation to the cup.

Figures 8 to 12, inclusive, are views corresponding, respectively, to Figures 1 to 5 inclusive, illustrating the development from the original slug to the substantially completed device, in the production of which the two initial steps are somewhat modified; and Figures 8ª to 12ª, inclusive, are end views of parts shown in Figures 8 to 12.

Figures 9ᵇ, 10ᵇ, and 11ᵇ are vertical sectional views illustrating instrumentalities employed for developing the work pieces shown in Figures 9, 9ª, to 11, 11ª, inclusive.

One example of an object having integral shank and cup, for the production of which the process of the present invention is especially adapted, is illustrated in Figures 6 and 6ª, wherein, 1 represents the cup, 2 the shank, and 3 a perforation in the shank of an electric cable terminal, the general construction and use of which are well known, and in the production of which the cup is usually of cylindrical form, while the shank is in the form of a flattened fin extending parallel to the axis of, and from one end of the cup, but in a plane offset from the axis and approximately tangential to the wall of the cup. This position of the shank is the result of the particular manner of pressing an axially related tapered shank of cylindrical section, as hereinafter described with reference to Figures 4, 4$^a$, 5$^b$, and 5$^c$, and the shank may take the form suggested by dotted lines at 2$^a$, in Figure 7, where it is centrally related to the cup 1$^a$.

In producing an article having the general characteristics of the integral cup and shank terminal shown in Figures 6, and 6$^a$, or suggested in Figure 7, a slug X of solid metal (Figures 1, 1$^a$) is procured from any suitable source, as by cutting off a section of a more or less round rod of copper or other metal, and which will answer the purposes of the present invention even though it be of comparatively irregular form; and this slug is dropped into a blanking die A (Figure 2$^b$) and there subjected to the action of a plunger or punch B to convert the slug into the blank $y$ (Figures 2 and 2$^a$), which blank has a body portion indicated by the vertical dimension $n$ and a reduced lower end $y'$ and a slightly cupped or recessed upper end $y^2$ with justified edges $y^3$. This blank is then dropped into a die C having a cup-forming cavity C', and a shank-forming cavity C$^2$, and in this die the blank $y$ is subjected to the action of a punch D which is of less transverse dimension than the cup cavity C', but greater than the internal dimension of the cup ultimately to be formed, so that while the outer portion of the metal, by which the blank exceeds the diameter of the punch D, is left free and unrestrained from flowing upwardly around the punch, the interior portion of the blank is displaced downwardly into the shank-forming portion C$^2$ of the die C; in other words, the blank is converted into a partially finished cup-portion 1$^a$ represented by the dimension $n'$ (Figure 3) and a partially finished integral shank-portion 2$^a$. The shank portion has now been developed by extrusion of the metal under the action of the punch, while the dimension $n'$ of the cup has been developed partly by the penetration of the punch into the blank $y$, and partly by upward flow of the metal into the space between the punch and the die. The blank 1$^a$, 2$^a$ resulting from this stage, which is shown in Figures 3 and 3$^a$, is now dropped into the upper elongated portions E' of the cup-drawing die E, having a cup-finishing cavity E$^2$ corresponding to the ultimate external dimension of the cup to be formed; and in this die, the blank 1$^a$, 2$^a$, is subjected to the action of a plunger F which forces said blank downwardly from the enlarged cavity E' and through the smaller cup-finishing cavity E$^2$, thereby drawing the sides of the cup blank 6 inwardly and upwardly and still further elongating said sides and forming the ultimate cup 1 having vertical dimension $n^2$. An important feature in the construction of the dies for flowing a portion of the metal upwardly into the wall of the cup resides in the diagonal or flaring form given to the dies at the points C$^3$, E$^3$, which favors escape of the metal into the wall-forming space of the die. The blank 1, 2$^a$, obtained at this stage, which is shown in Figures 4 and 4$^a$, is now ready to have its shank portion 2$^a$ flattened to the ultimate form 2 (Figures 5$^c$, 6, and 6$^a$) or the form suggested at 2' (Figure 5$^d$), and this may readily be done by the following instrumentality.

If the flattened shank 2 is to lie in an offset plane, as shown in Figures 6 and 6$^a$, the round symmetrically disposed shank 2$^a$ is first pressed between the flattening die H and the bed die G, as shown in Figure 5$^b$, to develop a partially flattened but flaring shank 2$^{ax}$ as suggested by dotted lines in Figure 5$^b$, and then pressed between finishing die H and bed die I, as shown in Figure 5$^c$. If the symmetrically disposed flat shank 2' is to be produced, the dies are changed accordingly. For instance, two movable dies K, L (Figure 7) are employed, and then are rocked as suggested in dotted lines to finish the flattening operation.

An important feature in the shaping of the flat shank, in whichever position the shank may be left, resides in the fact that the movable die H (Figure 5$^b$) or the dies K, L, (Figure 7) develop their initial bite upon the shank 2$^a$ at the point or points 4, which is an appreciable distance inside of the taper or reduction in the shank; and the impressing face or faces are inclined away from the work-piece so that, as the metal is displaced by the bite of the dies, it is simultaneously flowed in the direction of the axis of the shank and away from the cup, thus materially elongating the shank by the time it reaches its flattened state. Moreover, the displacement of this larger diameter of the blank, where the initial bite occurs, develops substantial shoulders 5 (Figures 5 and 6) between the cup 1 and the flattened shank, thereby permitting the development of width in the shank, which is required by specification for the commercial article, and making a stronger connection between the shank and the cup, which connection flares from the diameter of the cup end to the plane of the shank.

According to the modification of the process involving the steps illustrated in Figures 9, 9ª, 9ᵇ and 10, 10ª, and 10ᵇ, the dimension of the original slug or work-piece X' (Figures 8, 8ª) is relied upon to provide the shank portion 2ª' of the blank without extrusion or additional shaping; and the upper end of the slug is upset between a punch and a die, as suggested in Figure 9ᵇ in order to provide the blank $y^4$, in addition to its shank portion 2ª', with a head $y^5$ of proper dimension and with suitably tapered side walls to permit the formation of a cup blank by intrusion of a punch and upward flowing of the displaced metal to increase the depth of the cup wall. This latter procedure is then accomplished by means of the die C' and punch D', shown in Figure 10ᵇ, and in which the cavity of the die flares upwardly and facilitates displacement of metal under cupping action referred to, while the working end of the punch D' is approximately conical so that the resulting work-piece takes the form shown in Figures 10 and 10ª. From this point on the process can follow the details substantially as described in connection with Figures 4 to 6 or 7, inclusive, in that the cupped blank of Figure 10 is next forced through a reducing or drawing die E (Figure 11ᵇ) by means of a punch F in order to change to the cup shown at 1' in Figures 11 and 11ª, after which the shank-forming portion 2ª' can be flattened to produce the attaching shank 2', joined to the cup portion 1' by means of the shoulder 5', and the finished shank can be punched by some such method as suggested in Figure 6ᵇ.

I claim:

1. The improvement in the art of producing an object with an integral cup and shank, which consists in forging a piece of metal to produce a blank, comprising a cup-portion, a tapering portion and a shank portion, and then flattening the shank portion between dies which impinge the tapered portion, as well as the shank portion in advance of the remainder of the shank.

2. The improvement in the art of producing an object with an integral cup and shank, which consists in forging a piece of metal to produce a blank, comprising a cup-portion, a tapering portion and a shank portion, and then flattening the shank portion between dies which impinge the tapered portion as well as the shank portion, the dies being set to impinge against the tapered portion in advance of the remainder of the shank.

3. The improvement in the art of producing an object with an integral cup and shank, which consists in forging a piece of metal to produce a cup and a reduced shank joined together by a tapered portion, and then flattening the shank between dies which impinge against the tapered portion as well as the shank portion, and with the working face of a die inclined to the perpendicular of the line of die movement, thereby causing the metal of the shank to flow away from the cup.

4. The improvement in the art of producing an object with an integral cup and shank, which consists in forging a piece of metal to produce a blank comprising a cup portion, a tapering portion, and a shank portion, and then flattening the shank between dies which impinge against the tapered portion as well as the shank portion, while the working face of a die is inclined to the perpendicular of the line of die movement, thereby causing the metal of the shank to flow away from the cup, and thereafter completing the flattening operation by pressure between surfaces perpendicular to the line of die movement.

5. The improvement in the art of producing an object having an integral cup and shank, the same consisting in subjecting a metal blank to the action of a plunger in a cooperating die surrounding the plunger, and leaving a cup-wall space between them and formed with a shank cavity of lesser diameter than the plunger, a cup cavity which communicates with said shank cavity, an offset between said cavities corresponding substantially to the diameter of the plunger, and a second offset corresponding to said wall space and by said die and plunger; extruding a reduced shear area of the blank into the shank cavity and leaving in said cup cavity a wall defined by a shear area corresponding to the second offset.

6. The improvement in the art of producing an object having an integral cup and shank, the same consisting in subjecting a metal blank to the action of a plunger in a cooperating die surrounding the plunger, and leaving a cup-wall space between them and formed with a shank cavity of lesser diameter than the plunger, a cup cavity which communicates with said shank cavity, an offset between said cavities corresponding substantially to the diameter of the plunger, a second offset corresponding to said wall space and by said die and plunger; extruding a reduced shear area of the blank into the shank cavity and leaving in said cup cavity a wall defined by a shear area corresponding to the second offset; and drawing the resultant form through a die to reduce the diameter of the cup wall and eliminate the second offset.

Signed at Chicago, Illinois, this 22nd day of April, 1924.

CHARLES J. RATEIKE.